United States Patent [19]

Roland

[11] Patent Number: 4,555,167

[45] Date of Patent: Nov. 26, 1985

[54] MULTIPLE SOUND PICTURE PROJECTION CINEMA

[76] Inventor: Anthony M. Roland, 19 Albany St., London N.W.1, England

[21] Appl. No.: 519,127

[22] Filed: Aug. 1, 1983

[51] Int. Cl.[4] .................... G03B 19/18; G03B 21/32
[52] U.S. Cl. .................................... 352/133; 352/1; 352/36; 352/11
[58] Field of Search ............... 352/11, 132, 133, 1, 352/3, 5, 36; 353/48, 94

[56] References Cited

U.S. PATENT DOCUMENTS

| 1,543,892 | 6/1925 | Willard | 353/94 |
| 1,813,542 | 7/1931 | Owens | 352/36 |
| 2,734,420 | 2/1956 | Smith | 353/94 |
| 2,979,607 | 4/1961 | Herzfeld | 352/36 |

FOREIGN PATENT DOCUMENTS

| 2418946 | 3/1978 | France | 352/5 |
| 414560 | 8/1934 | United Kingdom | 352/1 |

Primary Examiner—Monroe H. Hayes
Attorney, Agent, or Firm—Howard C. Miskin

[57] ABSTRACT

An open air multiple screen cinema includes projection screens arranged outdoors in a circle or other arrangement about a centrally located automotive van having projection windows in alignment with the screens and housing angularly adjustable sound movie projectors directed through the windows to respective screens. A figure 8 magnetic induction loop is located within the viewing area of each screen and is electrically energized by an audio modulated current controlled by a respective movie sound projector and each of the viewers is provided with a magnetic field responsive receiver and coupled earphones so as to hear only the sound associated with the screen in the proximity of the viewer. The magnetic induction loops may be buried, at ground level, or supported overhead and may be of other configurations.

13 Claims, 18 Drawing Figures

F I G. 3
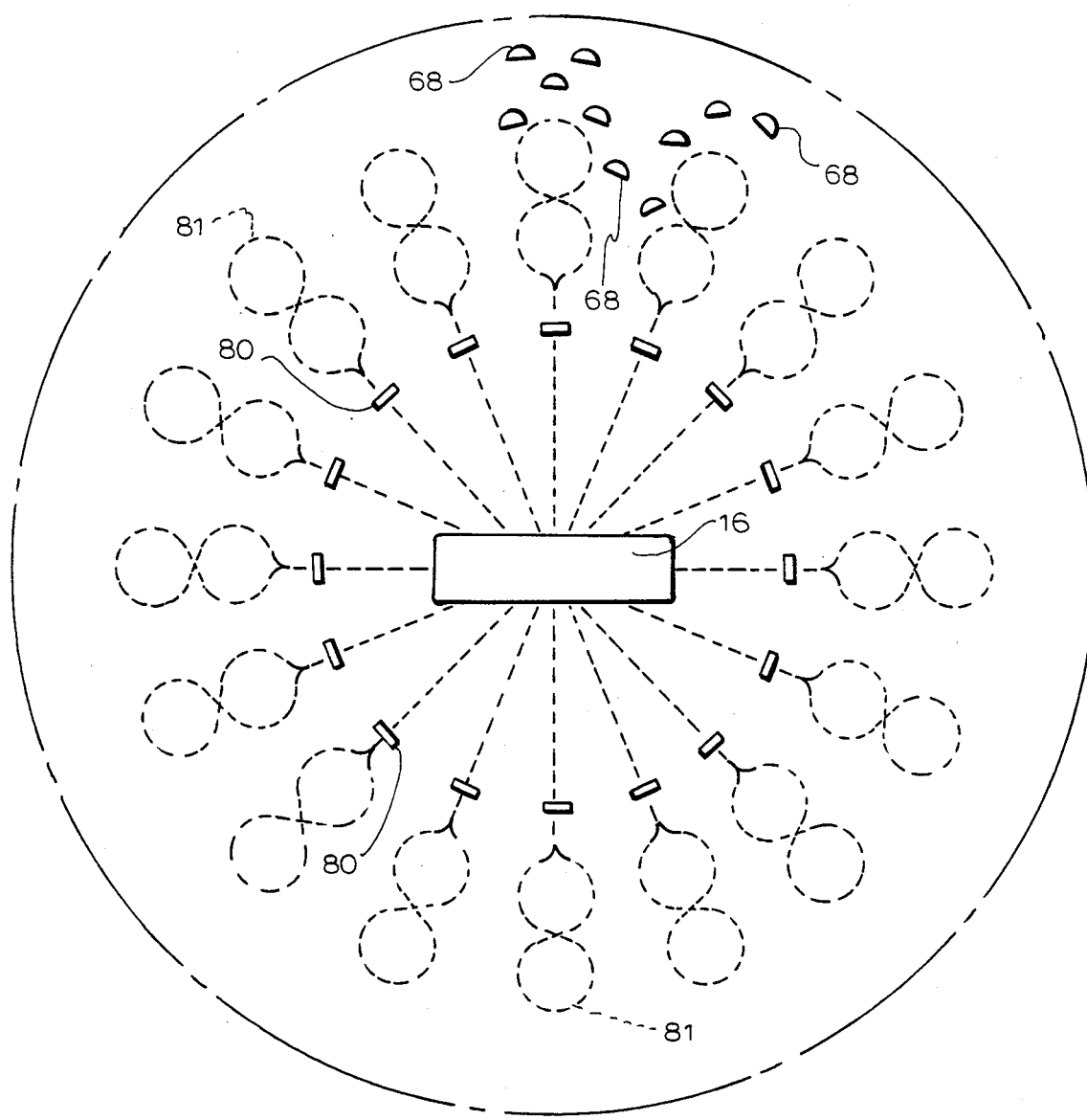

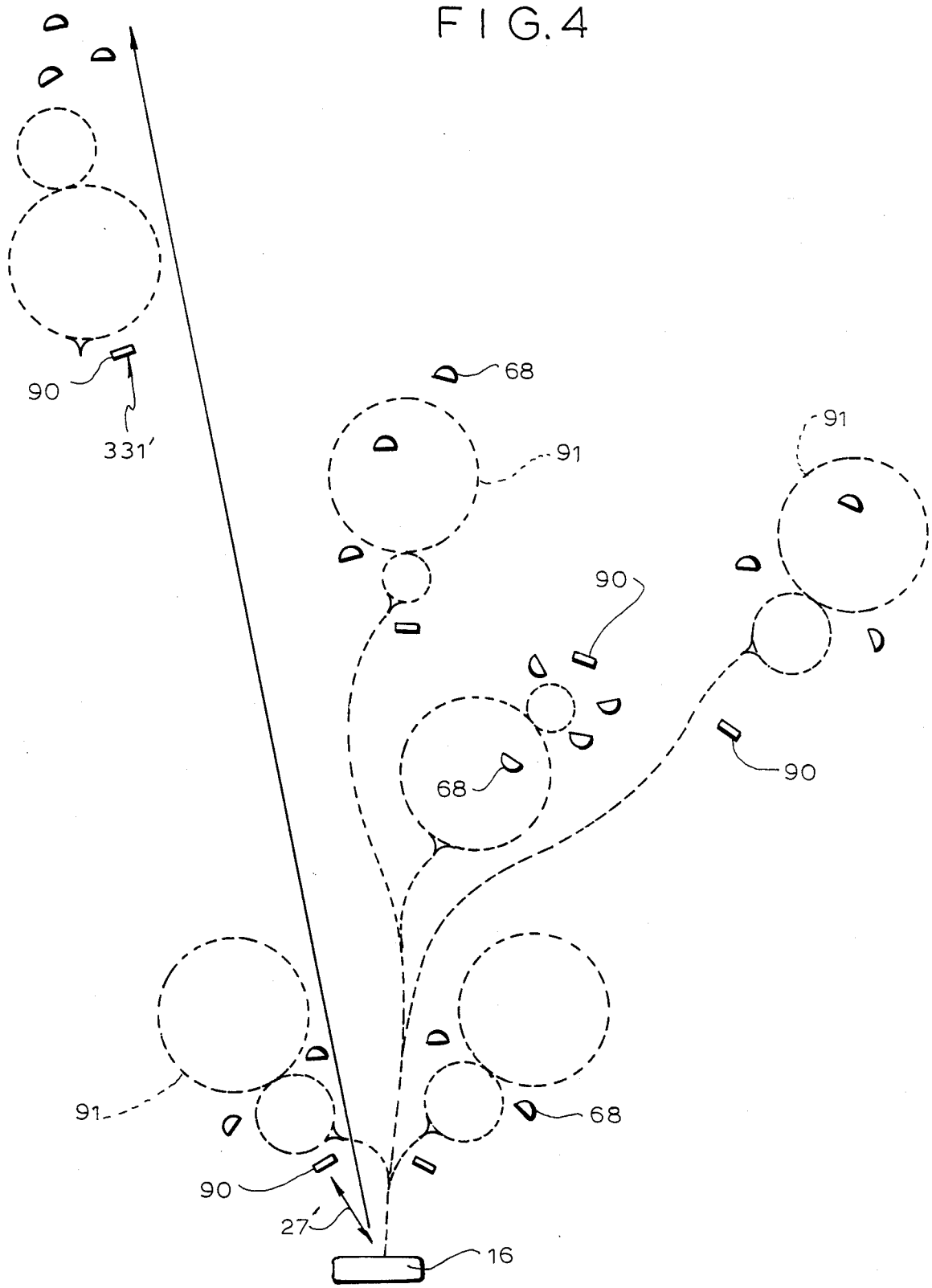

FIG. 6
FIG. 7
FIG. 5
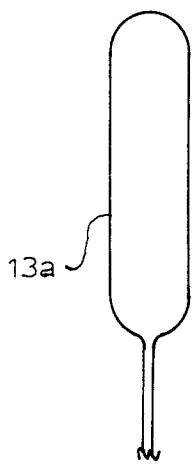
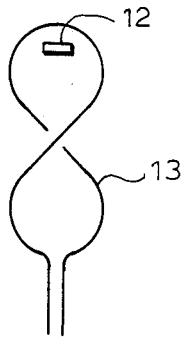
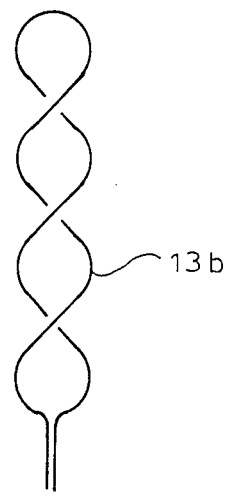
FIG. 8  FIG. 9  FIG. 10  FIG. 11
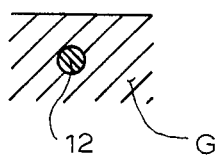
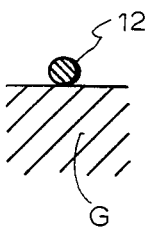
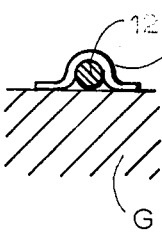
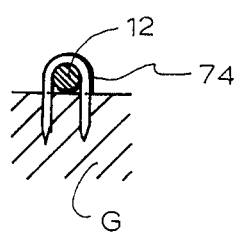
FIG. 12
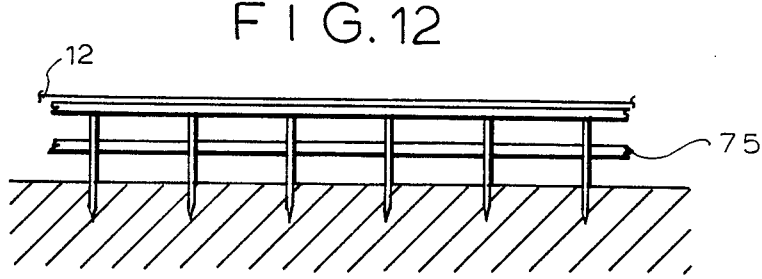
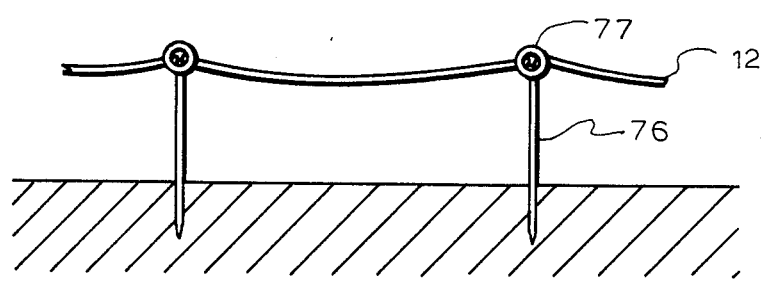
FIG. 13

MULTIPLE SOUND PICTURE PROJECTION CINEMA

BACKGROUND OF THE INVENTION

The present invention relates generally to improvements in display systems and it relates more particularly to an improved multiple screen open air cinema.

The conventional outdoor or open air cinema is an expensive, inconvenient, highly restricted system of little versatility and adjustability. It generally includes a single projector screen and industrial wired audio sound outlets arranged at fixed positions in an area in front of the screen and the viewers are limited to positions immediately adjacent to respective outlets with no freedom for movement. Alternatively, the sound accompanying the picture is projected in the usual manner, thereby requiring a much greater area for a given audience capacity so as not to impinge on the comforts of neighboring residents. Moreover, with the open air cinemas of the above types or heretofore proposed, the cinema is limited to one, or at mosts a very small number of screens, and a correspondingly small number of different subject matters being projected. Thus, the multiple screen cinemas heretofore available required separate discreet projection and viewing rooms or very large areas and were extremely limited and otherwise left much to be desired.

SUMMARY OF THE INVENTION

It is a principal object of the present invention to provide an improved display and exhibition system.

Another object of the present invention is to provide an improved sound motion picture system.

Still another object of the present invention is to provide an improved open air multiple screen cinema system.

A further object of the present invention is to provide a mobile open air multiple screen cinema system which is substantially self-contained and which may be easily and rapidly set up and disassembled and stored for transportation.

Still a further object of the present invention is to provide an improved system of the above nature characterized by its reliability, ease and convenience of use and application, superior results and great versatility and adoptability.

A multiple screen cinema system in accordance with the present invention includes a projection room having projection windows, a plurality of sound movie projectors located in the projection room and directed toward respective projection screens through the projection windows, field generators controlled by the projectors for producing and concentrating in a restricted area between each of the screens and a respective projector an audio modulated field, and a plurality of receivers located in and responsive to each of the modulated fields to produce corresponding audible signals.

In the preferred form of the improved system, the projection room is mobile and advantageously self propelled, such as an automotive van and has the projection windows located in its walls, and storage space for the various system components. The projectors are adjustably supported in the projection room and housed in the room are various electrical, electronic, and control components and motor driven electrical power generator. In the erected system, the screens are arranged in a circle around the projection room as its center. The modulated field is magnetic and is established and concentrated by FIG. 8 coils located at convenient levels between the screens and the respective projectors and electric currents modulated by the projector audio signal electrical outputs are delivered to the corresponding coils. The receivers preferably include earphones energized in any suitable and well known manner in response to the ambient magnetic field, such as a direct or indirect magnetic sound transducers.

The improved multiple screen projection system is highly self-portable, convenient, easily, simply, and rapidly erected and set up or disassembled and stored for transportation, produces precisely delineated picture and sound reception areas and is of great versatility and adaptability.

BRIEF DESCRIPTION OF THE DRAWINGS

FIG. 3 is a view similar to FIG. 2 showing an alternate arrangement of the projection screens and magnetic field coils;

FIG. 4 is a diagrammatic plan view showing another alternative arrangement of the projection screens and magnetic field coils;

FIGS. 5 to 7 are plan views of alternate forms of magnetic field generating coils;

FIGS. 8 to 11 are transverse sectional views showing different coil cable ground anchoring arrangements;

FIG. 12 is an elevational view illustrating a raised magnetic coil structure;

FIG. 13 is a view similar to FIG. 12 of an alternate structure for supporting a raised magnetic coil;

DESCRIPTION OF THE PREFERRED EMBODIMENT

Figure 1:
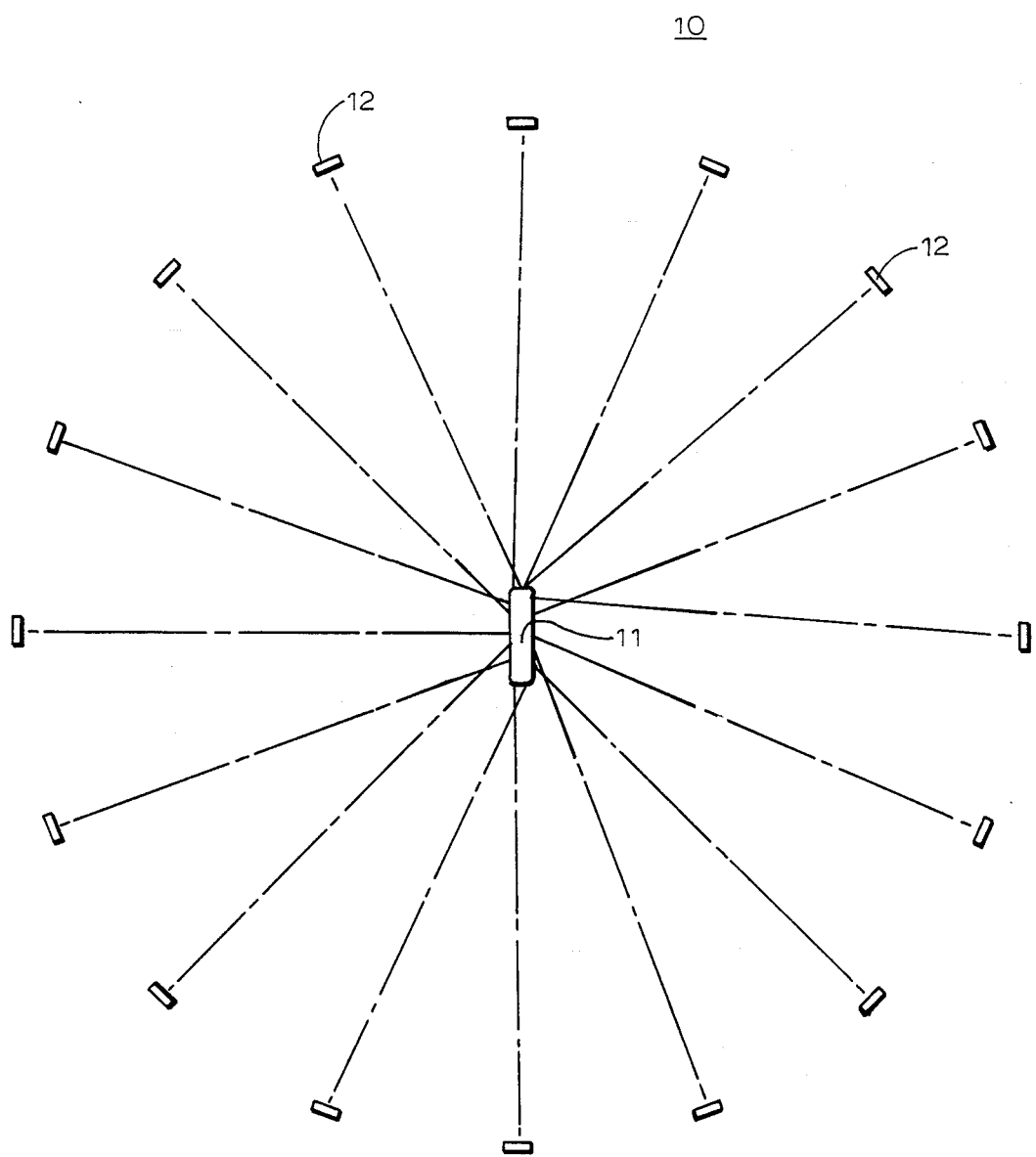
FIG. 1 is a diagrammatic top plan view illustrating the arrangement of the projection van and projection screens, in accordance with a preferred embodiment of the present invention.
Figure 2:
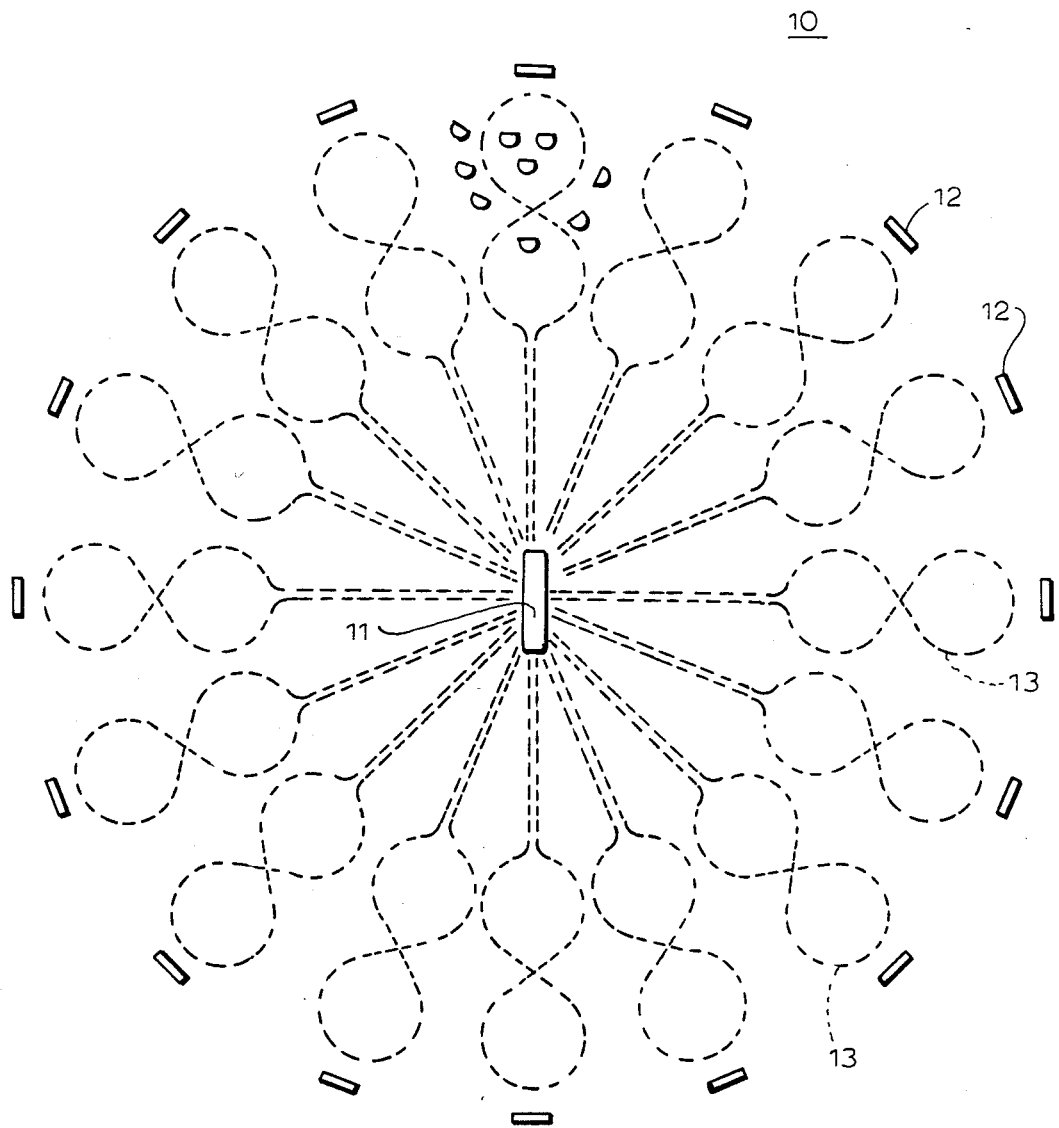
FIG. 2 is a view similar to FIG. 1 showing the arrangement of the projection screens and magnetic induction coils.
Figure 14:
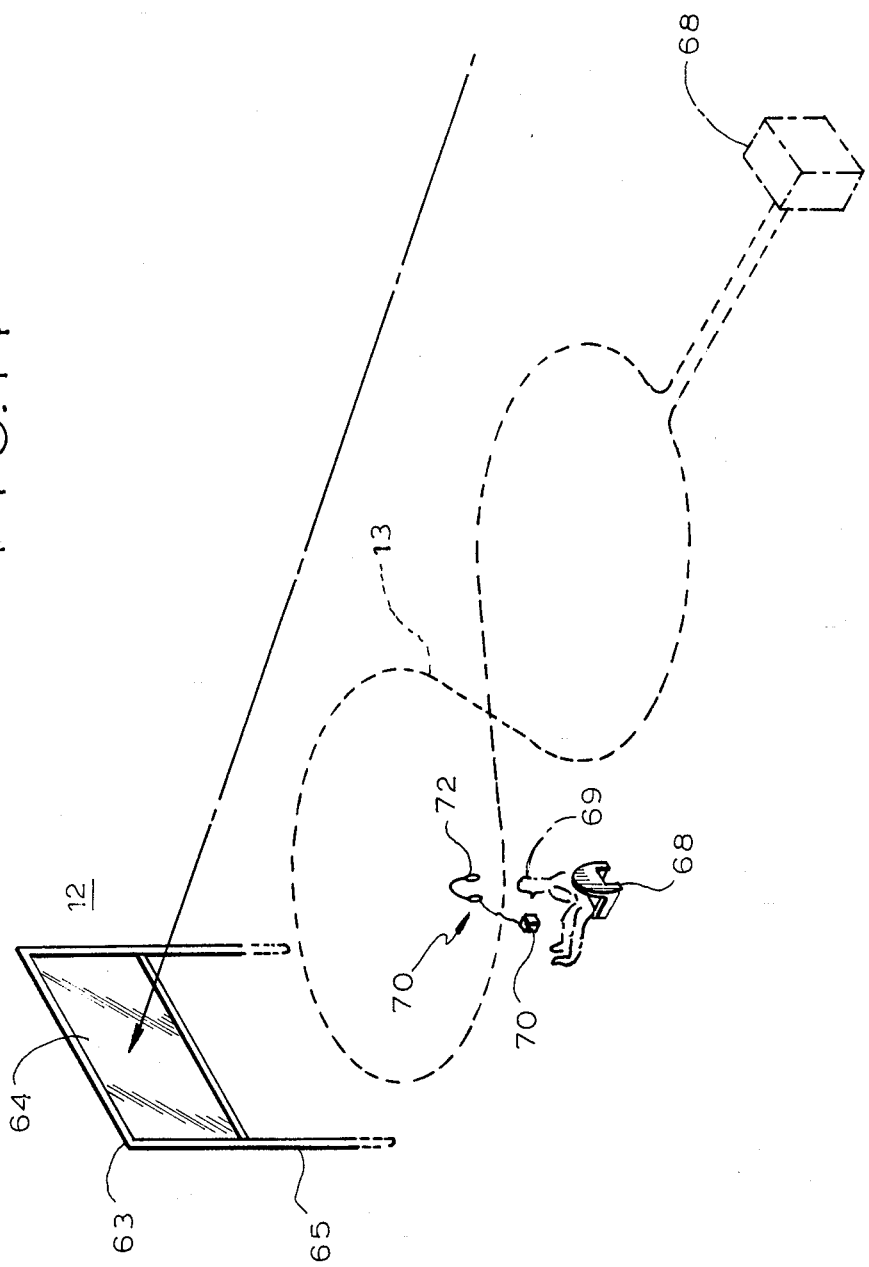
FIG. 14 is a perspective view of a single sound and picture projection section.
Figure 15:
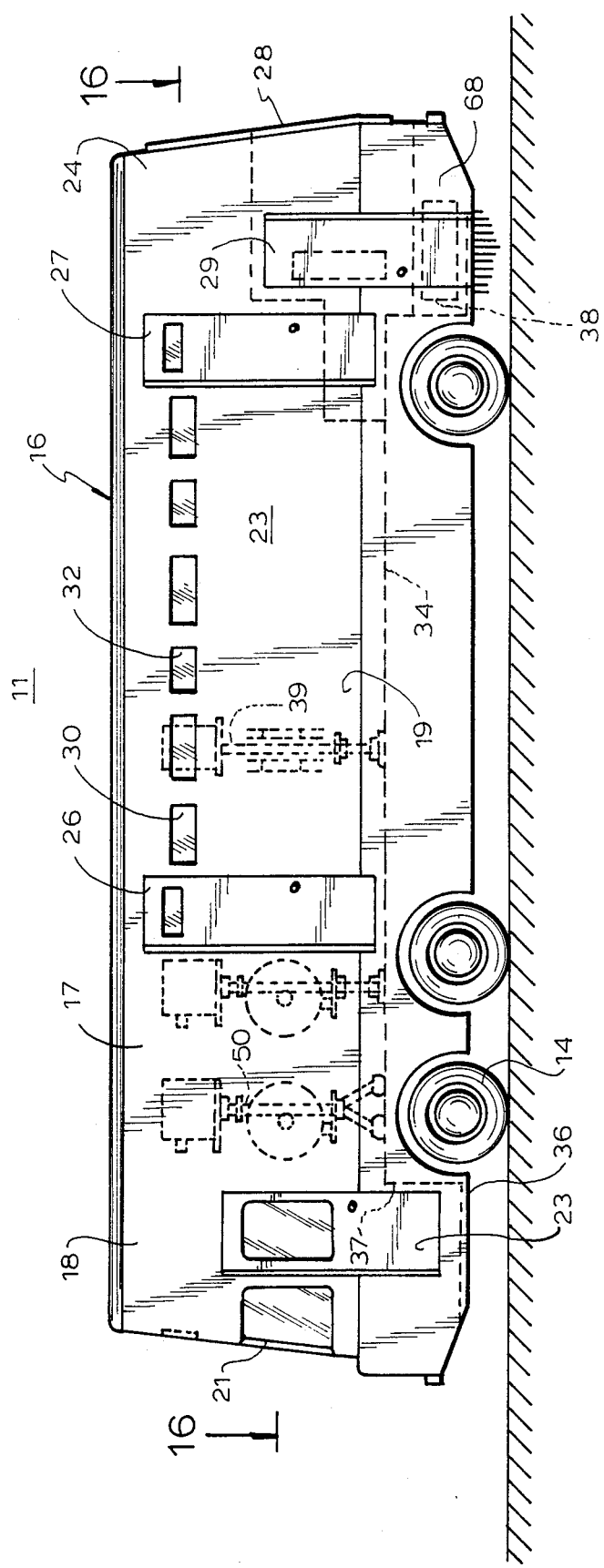
FIG. 15 is a side elevational view of the projection van of the projection system.
Figure 16:
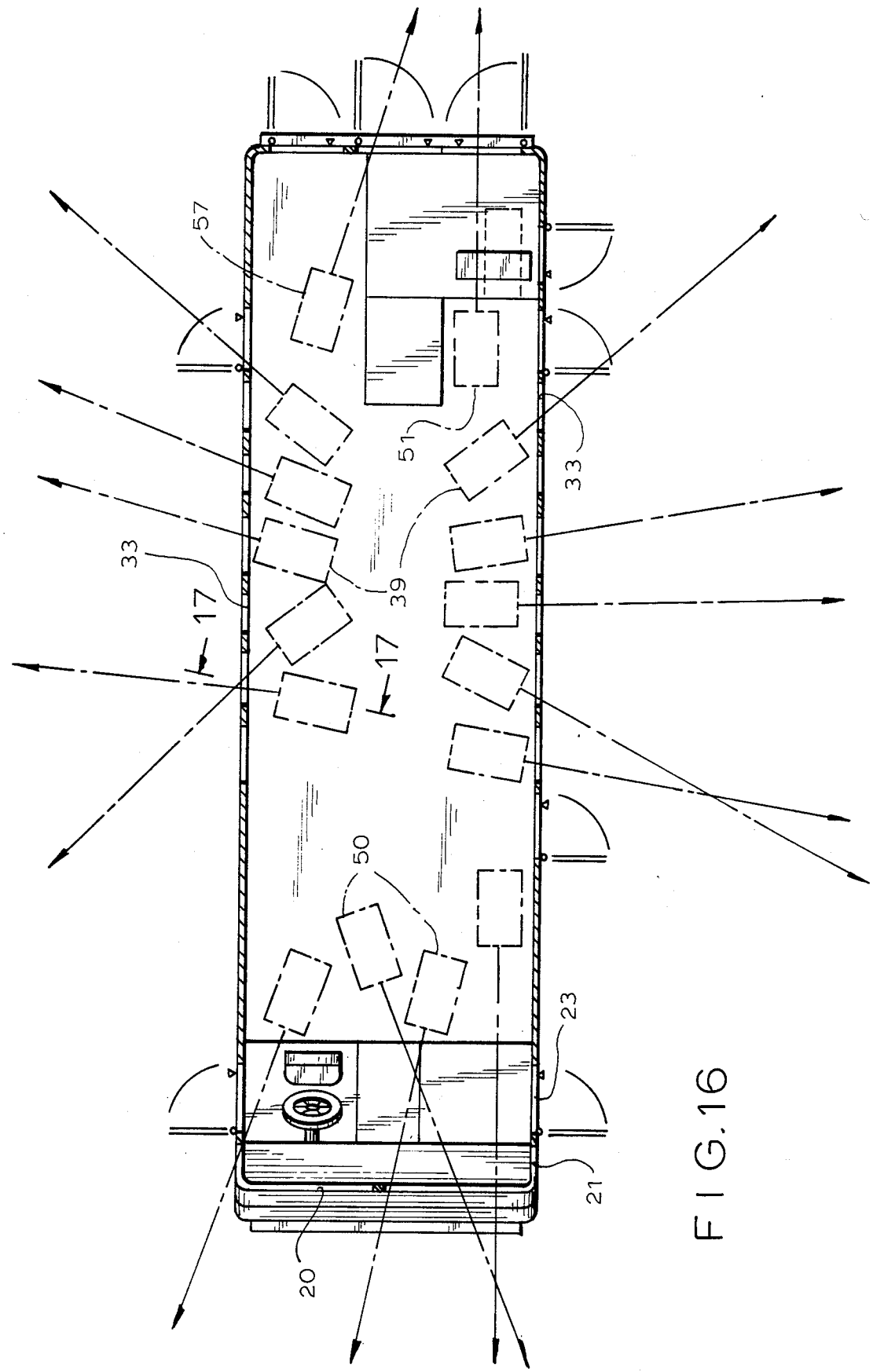
FIG. 16 is a sectional view taken along line 16—16 in FIG. 15.
Figure 17:
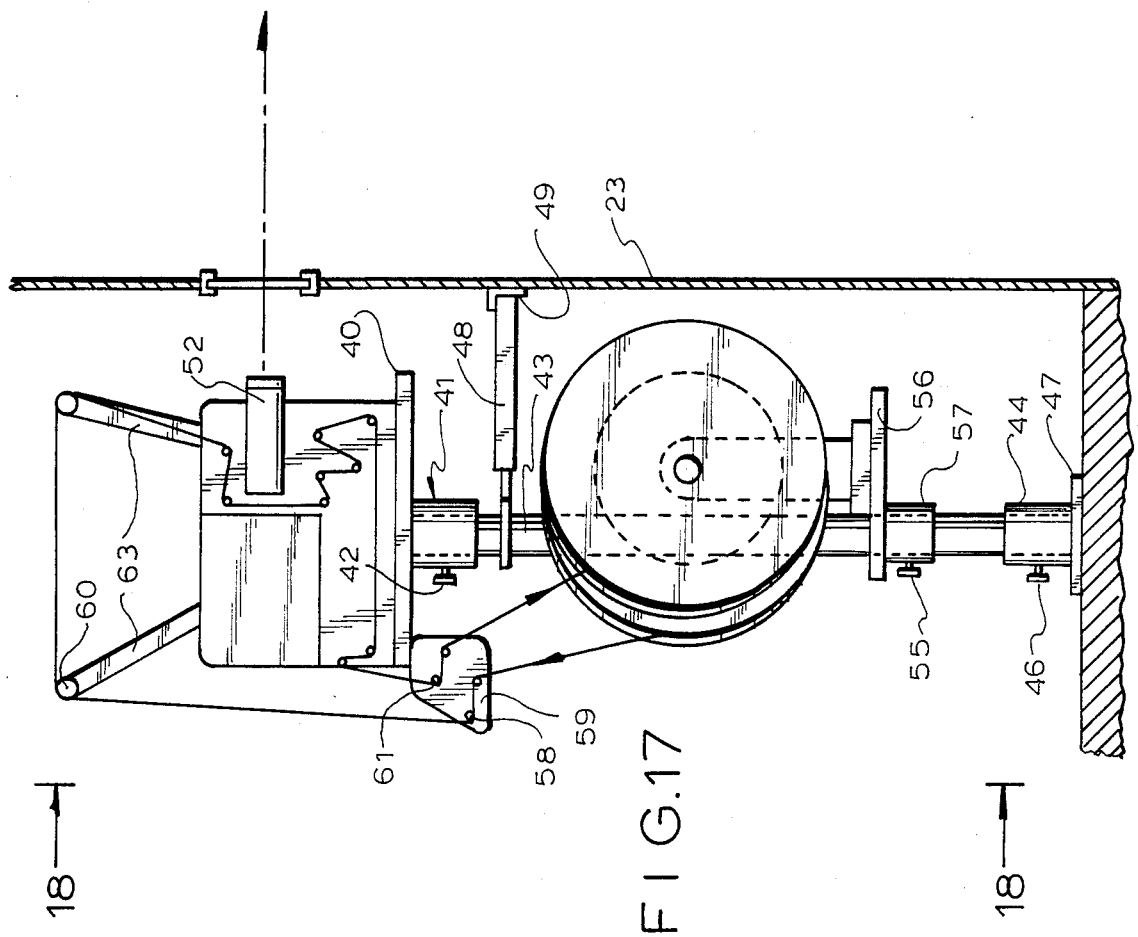
FIG. 17 is a sectional view taken along line 17—17 in FIG. 16.
Figure 18:
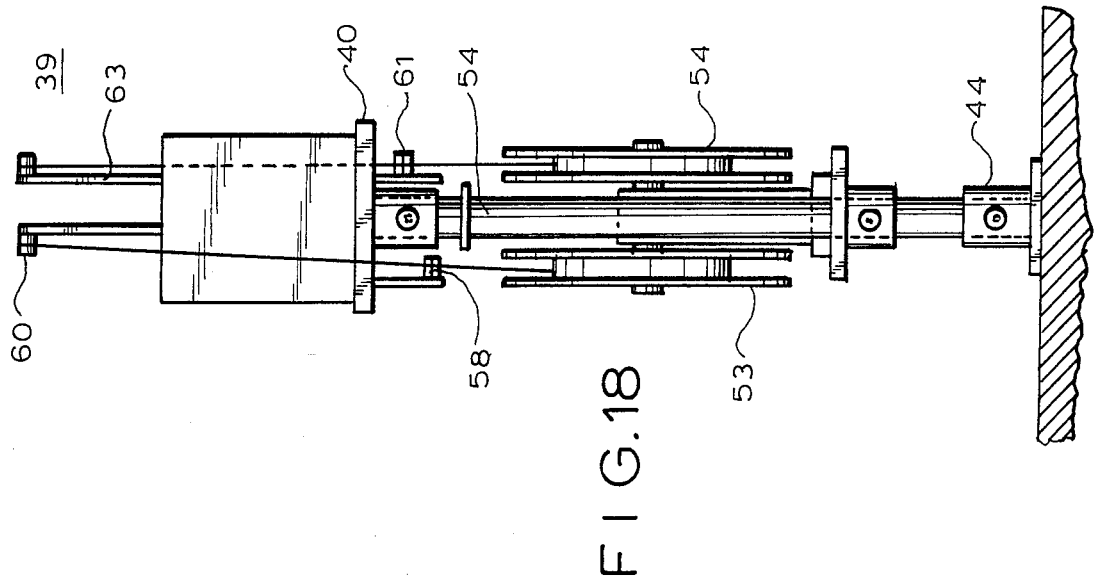
FIG. 18 is a view taken along line 18—18 in FIG. 17.

Referring now to the drawings, particularly FIGS. 1, 2, 8 and 14 to 18 thereof which illustrate a preferred embodiment of the present invention, the reference numeral 10 generally designates the improved multiple screen cinema system which includes a central projection room 11, a plurality, for example, sixteen as illustrated, of upright portable screens 12 which are equidistant from projection room 11 and equally peripherally spaced in a circle about projection room 11 at its center and a magnetic induction coil 13, preferably of FIG. 8 configuration, as shown, extending from proximate each screen radially toward projection room 11. The radius of the locus circle of screens 12 may be as desired, for example, 200 feet and the number and arrangement of the screens may be altered to fit the outdoor terrain in which the system is located or to accomodate other conditions or desires.

The projection room 11 is mounted on wheels 14 and is self-propelled being defined by an automotive van 16 including a main body 17 with a front motor and driver section 18 communicating with the trailing storage section 19 constituting the main part of the van. Driver section 18 is provided with a front transparent windshield 20, side windows 21 and opposite access doors 22 having windows. Storage section 19 includes longitudinal side walls 23 and a vertical transverse rear wall 24 front and rear side doors 26 and 27 respectively being provided in side walls 23 and three side-by-side rear doors 28 being provided in storage section rear wall 24. Also provided in the rear portion of one of the side walls 23 is an access door 27. Formed in the upper border of each side wall 23 between doors 26 and 27 and about 9½ feet above ground is a group of long rectangular projection windows illustrated in a four in number, and a pair of short, rectangular projection and viewing windows 32 arranged between successive pairs of projection windows 32, the windows 30 and 32 being at a common level. Projection windows are also formed in a pair of the rear doors 28 at the level of windows 30 and 32 and all of the projection windows are provided with transparent window panes 33.

The bottom of storage section 19 is defined by a horizontal floor 34 a short distance above the level of wheels 14 and joining a front lower horizontal floor 36 of driver section 18 by a vertical partition 37. The rear of floor 34, by a vertical partition, joins a lower rear floor 38 disposed rearwardly and at about the level of the center of rear wheels 14. There is forward visual access from the front of storage compartment 19 through windshield 20 and there is rear visual access from the rear of storage compartment 19 above floor 34 through the rear projection windows in doors 28.

A sound movie projector 39 is associated with each projection screen 12 and is adjustably housed in van 16. A group of projectors 39, for example five, is located along each side wall 23 and the individual projectors are angularly adjusted to project a picture through a corresponding window 30 or 32 to a respective screen 16. Each of the projectors 39 of the side wall group is located on a vertically and angularly adjustable platform 40 provided with a depending coupling socket 41 having a set screw 42. Each socket 42 engages the top end of a cylindrical post 43 whose bottom nests in a base pocket 44 provided with a set screw 46 and a bottom wall 47 secured to floor 34. A stabilizing arm 48 of adjustable length extends from and is suitably coupled at one end to the upper part of each post 43, and is separately pin connected at its other end to the horizontal leg of a longitudinal angle member 49 affixed to wall 23. Four projectors 50 similar to projectors 39, some of which are preferably dolly mounted and some of which may be fixedly mounted are located in the forward portion of storage section 19 and are directed through windshield 20 to corresponding screens 12, and a pair of projectors 51, likewise similar to projectors 39, are located at the rear of storage section 19 and are directed through the rear door windows to respective screens 12.

The projectors 39, 50 and 51 are of conventional movie sound projector construction and include projection lenses 52, projection lamps and housings, film advancing mechanisms, driven film take up reels and feed reels, shutter mechanisms, pickup devices for deriving sound signals from the film and amplifiers for producing an amplified output audio electrical signal. The system may use normal lenses or preferably "Long throw" lenses, the length being 7.87 inches. While the film feed and take-up reels may be supported in the known manner from a pair of arms mounted directly on the projector, the feed and take-up reels 53 and 54 respectively are advantageously supported as illustrated, by a bracket 56 on post 43 below platform 40. Preferably reels 53 and 54 have high capacities, for example, 6000 feet capacity enabling 2¾ hours of continuous projection. Bracket 56 is vertically adjustable and includes a collar 57 slidably engaging post 43, and having a set screw 55. The take-up reel 54 is driven concurrently with the projector 39 in any suitable manner and the film drawn from feed reel 53 is led about guides 58 on a guide plate 59 depending from platform 40 along guides 60 in arms 63, along the camera film guides through the projection station then along guides 61 on guide plate 59 to take-up reel 54.

Each projection screen 12 includes a rectangular frame 63, for example 10 feet long by 7½ feet high, which supports a projection screen panel or surface 64. Colinearly depending from the frame side arms are side-support legs 65 which may be driven into the ground to support each screen in a vertical plane tangent to the locus circle of screens 12. Other suitable structures may be provided for supporting the screens 12 such as guy cables, scaffolding or the like.

Extending radially from each projection screen 12 toward the projection room 11 is an electro-magnetic induction coil 13 which is illustrated in the form of a single turn FIG. 8 coil open at its medial inner end which is intermediate a respective projection screen 12 and projection room 11. The inner free ends 66 of each induction coil 13 is connected by a suitably magnetic field shielded cable 67 to the relatively high current output of a respective amplifier 68 located in projection room 11. Each amplifier 68 is controlled by the audio electric signal output of a corresponding projector to audio modulate the current through the respective coil 13 to produce an audio modulate magnetic field within and in the immediate vicinity of the coil 13 associated with the picture projected on screen 12. The coils 13 may be positioned in any suitable manner, for example, they may be underground or at the surface, or they may be supported above ground by posts or fences or the like. Moreover, the coils 13 may be of other configurations than FIG. 8, for example, they be single loop or a series of successive end-to-end loops.

Portable stackable or collapsible seats 68' are provided to seat the viewers, and may be movably randomly located, wherever desired, to view a selected screen 12. The seats 12 do not contain any significant amounts of magnetic field absorbant material and are advantageously of the shell type of a plastic composition construction and are light in weight and easy to handle and move.

Each of the audience or viewers 69 is provided with a sound receiver 70 which includes a magnetic field responsive receiver 71 whose output is connected to a pair of earphones 72. The receiver 71 is of known or conventional construction and may include a magnetic electrical transducer whose output is connected by way of an amplifier to the earphones 72.

The room 16 houses the projectors, amplifiers, the electrical control and energizing components, a motor generator for energizing the various electrical components and in addition has a storage space for much of the other material and components, for example the reels of film, etc. Access to the various components, equipment, and projectors are provided by passing in the van 16. The motor-generator has little or no vibration and is silenced.

In the application of the improved multiple screen cinema described above, the van 16 is located in a suitable preferable flat terrain and the screens 12 are erected in a circle or other suitable arrangement around the van 16 and the coils 13 suitably positioned and coupled to the respective audio amplifiers 68. The motor generator is started and the projectors are loaded.

The audience locate themselves in positions of convenient viewing of a screen 12 which will show the subject matter they desire, a different subject matter being shown on each screen. Each viewer applies the receiver coupled earphones and hears only that sound associated with the subject matter projected on the screen being viewed. The shapes of the modulated magnetic fields are such as to be concentrated in respective restricted areas in front of corresponding screens so that viewers within or closely proximate to such areas will hear only the sound associated with the picture on the viewed screen to the exclusion of the sound associated with the other projected pictures, the areas separating the viewing areas are substantially magnetic field-free.

As illustrated in FIGS. 8 to 13 of the drawings the induction coils 13 may be buried underground in the soil or other substrate G as shown in FIG. 8, they may lie unanchored on the substrate, as shown in FIG. 9 or they may lie on the substrate G and be secured in position by tape saddles 73 encircling the top of the coil cable and affixed to the substrate or by U-shaped staples 74. The coil 13 as shown in FIG. 12 may be mounted atop a fence 75 or may be supported above ground by vertical posts 76 driven into the substrate and terminating at their tops in loops 77 traversed by the respective coil 13.

Moreover the magnetic field generating coil may be a single elongated convolution or loop 13a open and connected at one end to the respective current amplifier as shown in FIG. 6 or may be a series of end-to-end cross over loops to form an elongated or otherwise shaped induction coil 13b as shown in FIG. 7, with one of the loops open and connected to a respective amplifier. Furthermore the screens 12 need not be located outside the field generating coils 13, but as shown in FIG. 5 the screens may be located within the loops and are advantageously located so that an excessive amount of the magnetic fields associated with the screens does not extend outside the respective screen viewing area.

Referring now to FIG. 3 of the drawings which illustrates another embodiment of the present invention differing from that first described primarily in that the projection screens are located between the field generating coils and the projection van. Specifically the projection van 80 is similar to the van 16 in structure and contents and is located at the center of the circular locus of peripherally spaced screens 80 having translucent surfaces and being equally radially spaced from the van 16 about 30 feet. A magnetic field generating coil 81 of FIG. 8 or other desirable configuration extends outwardly from and is in axially alignment with each screen 80 and is connected to an amplifier which is audio modulated by a corresponding sound projector in van 80. The operation of the last described arrangement is similar to that first described except that the audience or viewers are located in selected viewing and listening areas outside the locus of screens 80.

It should be noted that the separate viewing listening areas may be disposed relative to the projection van 16 in any desired or random arrangement as dictated by the surrounding terrain and other conditions. Thus, as illustrated in FIG. 4 the screens 90 may be located at various distances from one side of van 16 with the projection lines between the screens and the respective projectors not overlapping. A magnetic field producing coil 91 of FIG. 8 or other shape is located in the viewing area of each screen 90 and is dimensioned and located to produce a magnetic field confined to such viewing area and not overlapping or being highly attenuated in any other viewing area. As in the other embodiments, the viewers provided with magnetic field sensitive receiver sit in a selected viewing area and hear the sound associated with the viewed picture, the coils 90 being energized by currents from amplifiers whose outputs are modulated by respective sound projectors.

The audio loops may be used alone without the visual projection, such as for dancing or other entertainment.

While a truck has been illustrated for mobile application, the projection room could be located in a building.

While there have been described and illustrated preferred embodiments of the present invention, it is apparent that numerous alterations, additions, and omissions may be made without departing from the spirit thereof.

I claim:

1. A multiple screen cinema comprising a projection room having projection windows, a plurality of mutually spaced proximate projection screens spaced from said projection room, a plurality of sound movie projectors located in said projection room and projecting different images toward respective projection screens through said windows, means responsive to each of said sound projectors for producing and limiting to a restricted area within the viewing area of each of said screens an audio modulated magnetic field, each restricted area being accommodative of a plurality of viewers and receiver means carried by each viewer located in a restricted area and responsive susbstantially only to the modulated magnetic field in the respective area for producing corresponding audible signals and being substantially nonresponsive to the magnetic fields in the areas other than that in which the viewer is located but being responsive to the magnetic field in any of the other areas in which said viewer is located.

2. The multiple screen cinema of claim 1 wherein the locus of said projection screens in a circle with said projection room being located at its locus.

3. The multiple screen cinema of claim 1 wherein said projection room comprises a mobile vehicle.

4. The multiple screen cinema of claim 1 wherein said projection room comprises a self-propelled motor vehicle.

5. The multiple screen cinema of claim 1 including a plurality of portable seats substantially free of magnetic materials removably located in said magnetic fields.

6. The multiple screen cinema of claim 1 wherein including means for individually angularly adjustably supporting said movie projectors in said projection room.

7. The multiple screen cinema of claim 1 wherein said field producing means comprises a coil of wire located in an area overlapping the viewing area of each of said screens and means for feeding electric currents through said coils modulated in response to the audio signal outputs of said projectors.

8. The multiple screen cinema of claim 7 wherein said wire coils are imbedded in the ground in the viewing areas of said screens.

9. The multiple screen cinema of claim 7 wherein said wire coils are supported overhead in the viewing areas of said screens.

10. The multiple screen cinema of claim 7 wherein said coils of wire are of FIG. 8 configuration.

11. The multiple screen cinema of claim 7 wherein each of said screens is located between said projection room and a respective coil.

12. The multiple screen cinema of claim 7 wherein each of said coils is located between said projection room and a responsive screen.

13. A mobile multiple sound system comprising a mobile control room; a plurality of spaced separate coils a plurality of recorder audio modulated amplifiers connected to respective coils to produce different audio modulated magnetic fields in separated areas the magnetic field in each area being highly attenuated in other areas, and portable magnetic field responsive audio output receivers movably located in each of said areas and responding only to the modulated magnetic field in the area in which the receiver is located to produce a corresponding audio signal and being sensitive to the magnetic fields in the other areas but not responding thereto.

* * * * *